United States Patent [19]

Allen et al.

[11] Patent Number: 4,663,706

[45] Date of Patent: May 5, 1987

[54] MULTIPROCESSOR MULTISYSTEM COMMUNICATIONS NETWORK

[75] Inventors: James C. Allen, San Jose; Wendy B. Bartlett, Los Altos; Hoke S. Johnson, San Jose, all of Calif.; Steven D. Fisher, Belmont, Mass.; Richard O. Larson, Fremont; John C. Peck, Mountain View, both of Calif.

[73] Assignee: Tandem Computers Incorporated, Cupertino, Calif.

[21] Appl. No.: 542,187

[22] Filed: Oct. 14, 1983

Related U.S. Application Data

[63] Continuation-in-part of Ser. No. 437,399, Oct. 28, 1982.

[51] Int. Cl.[4] .................. G06F 13/38; G06F 15/16
[52] U.S. Cl. .................................................. 364/200
[58] Field of Search ...................... 364/200 MS File

[56] References Cited

U.S. PATENT DOCUMENTS 4,384,322  5/1983  Bruce et al. ...................... 364/200
4,428,043  1/1984  Catiller et al. ..................... 364/200
4,447,871  5/1984  Terada et al. ...................... 364/200
4,466,063  8/1984  Segarra et al. ..................... 364/200

Primary Examiner—Thomas M. Heckler
Attorney, Agent, or Firm—Townsend and Townsend

[57] ABSTRACT

A plurality of multiprocessor systems is arranged in a high speed network to allow any processor in one system to communicate with any processor in another system. The network may be configured as a multi-node dual bidirectional ring having a multiprocessor system at each node. Packets of information may be passed around the ring in either of two directions and are temporarily stored in buffer memory locations dedicated to a selected destination processor in a selected direction between each successive transfer between neighboring nodes. The buffer locations are managed so that a node can request an adjacent node to stop transmitting packets if the buffer is becoming full from that direction and request resumption of transmission of packets as the buffer empties.

3 Claims, 14 Drawing Figures

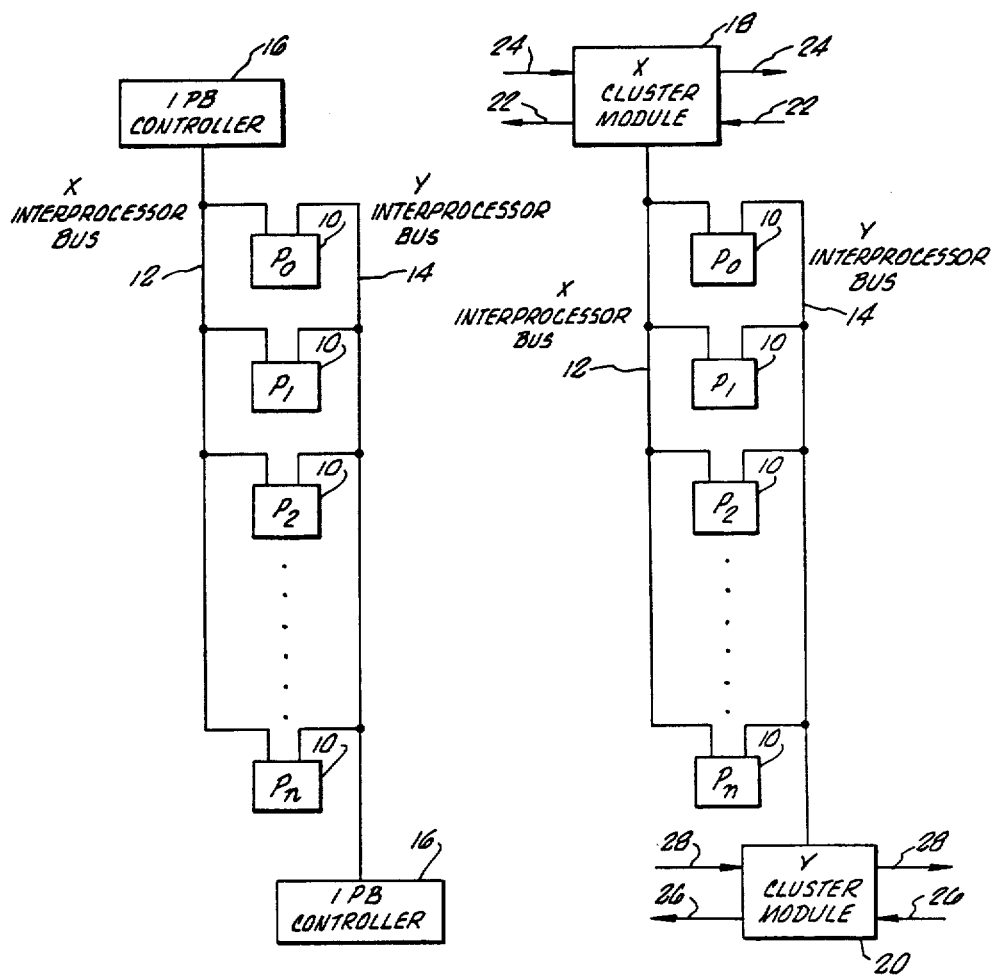

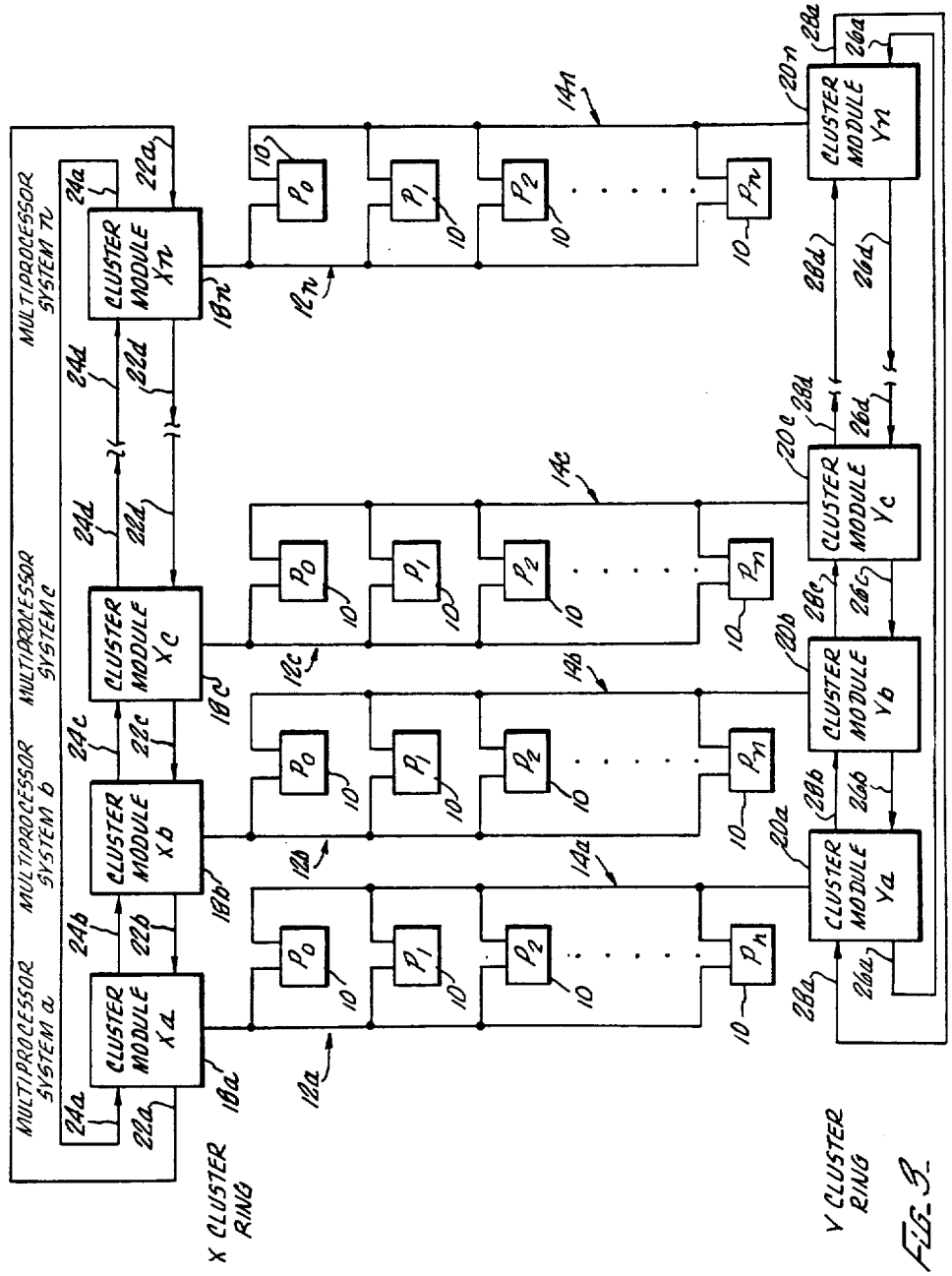

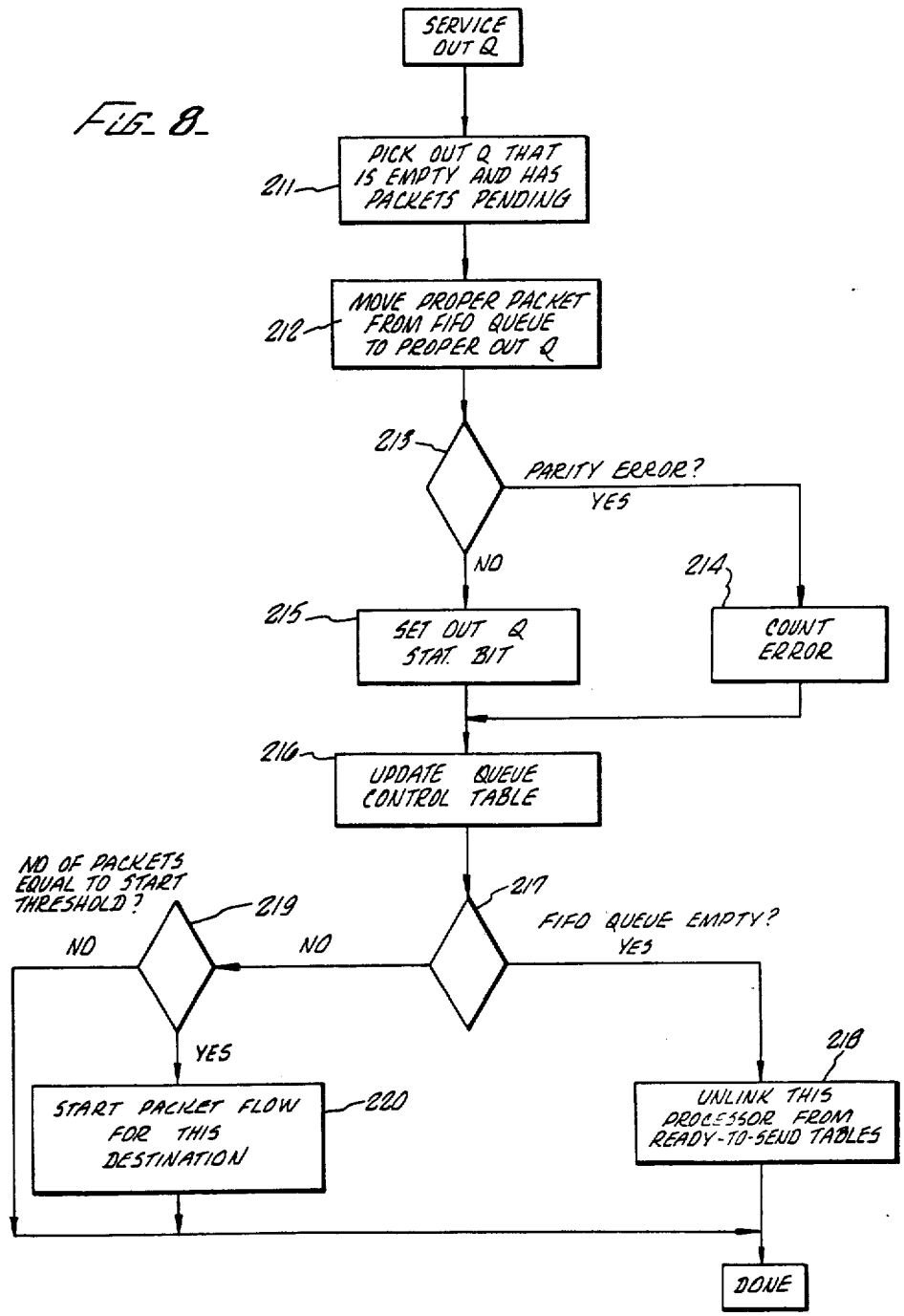

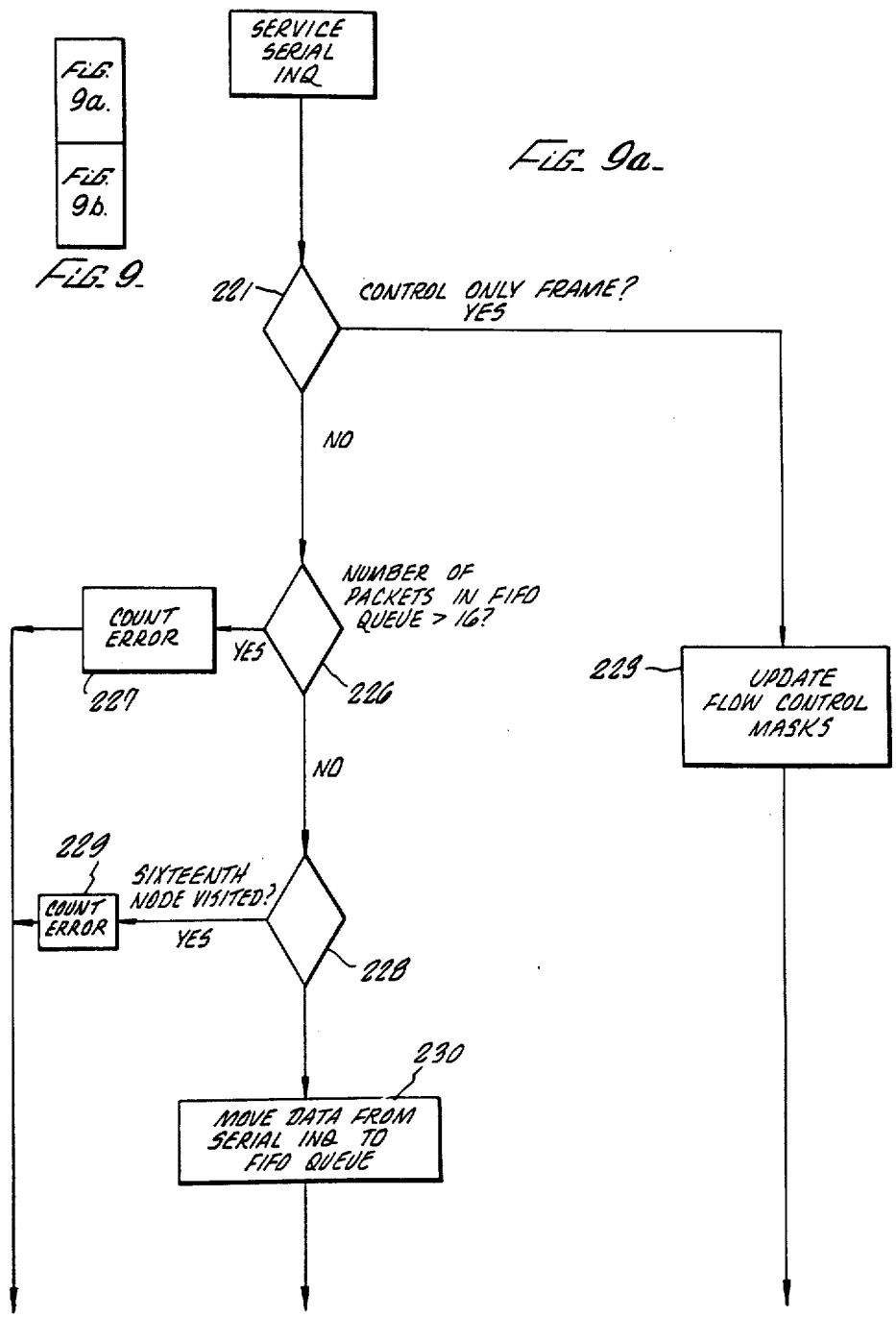

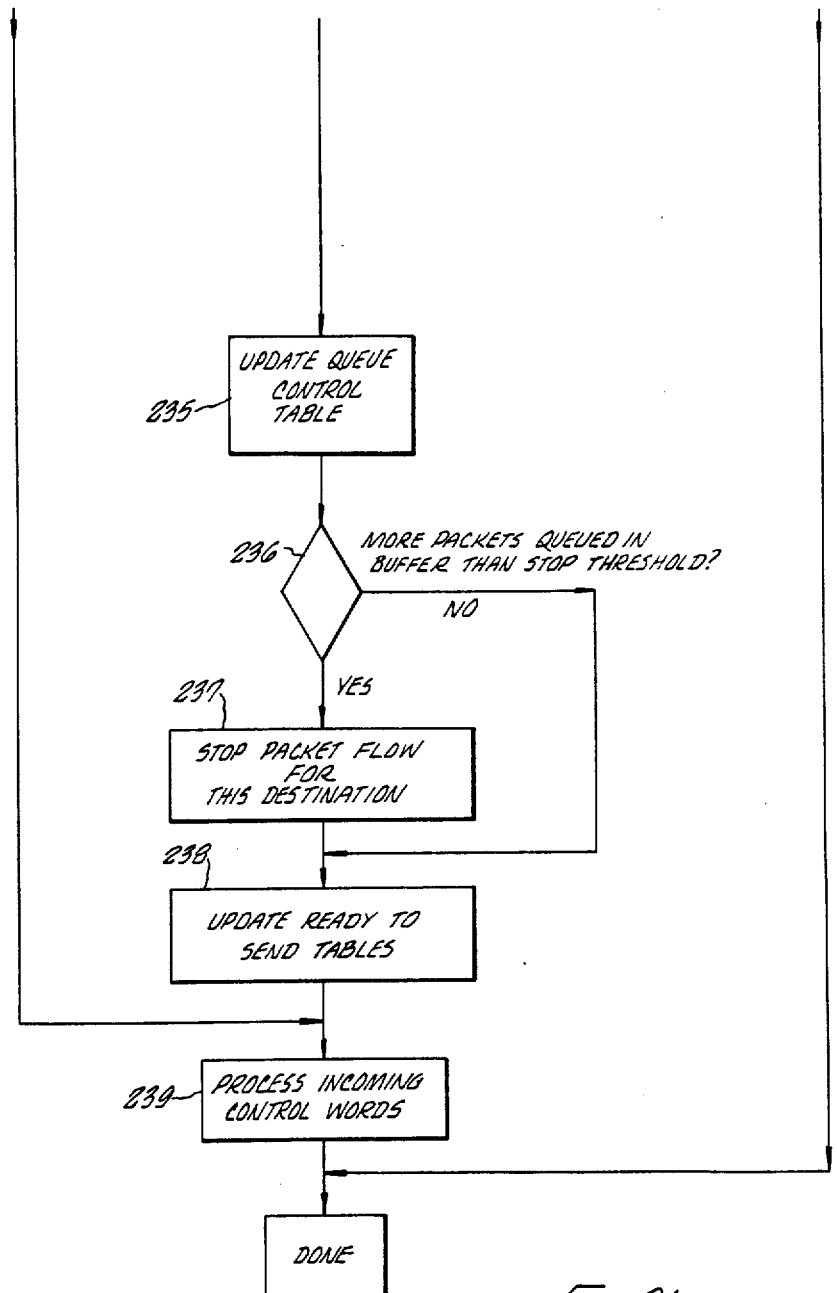

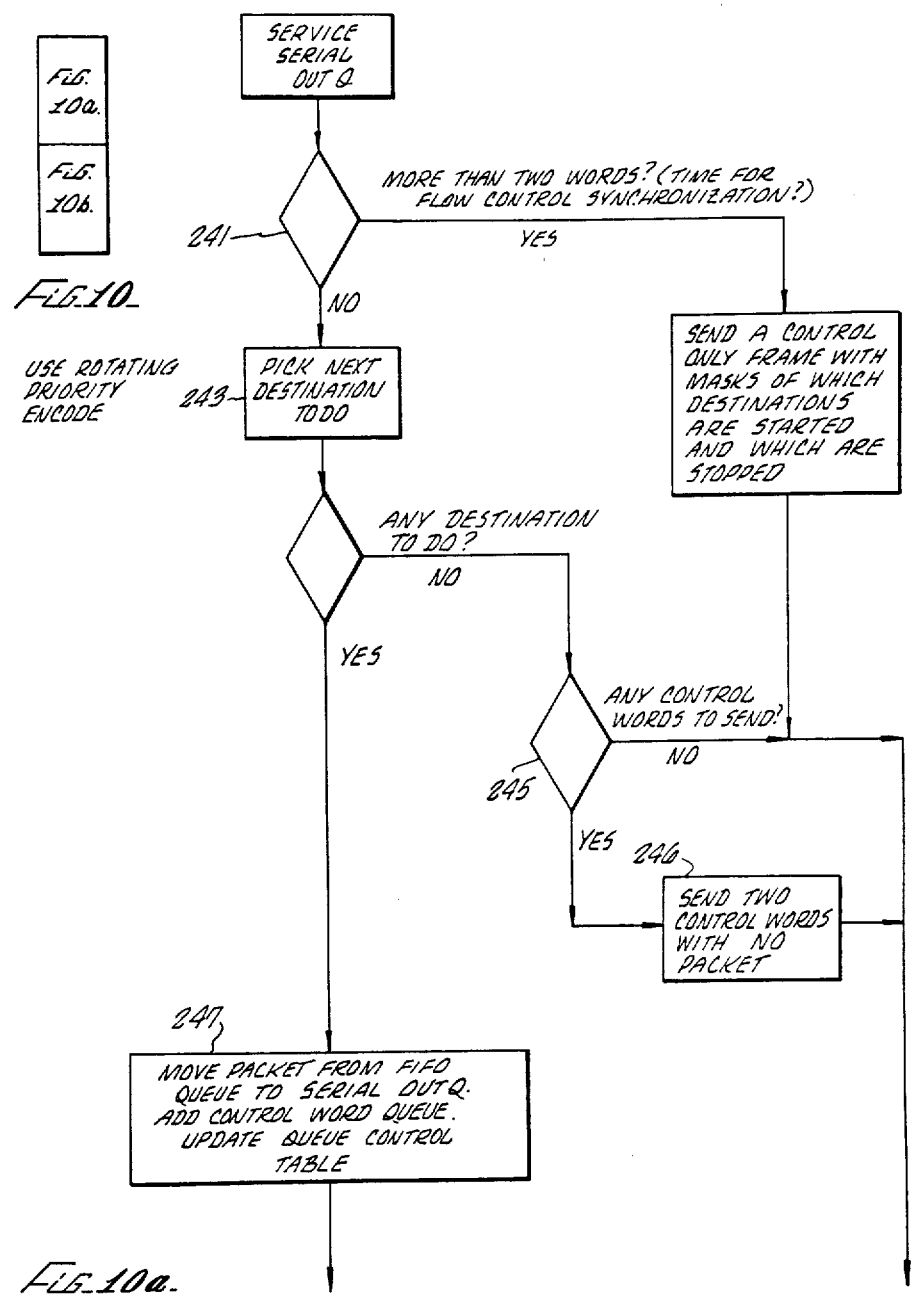

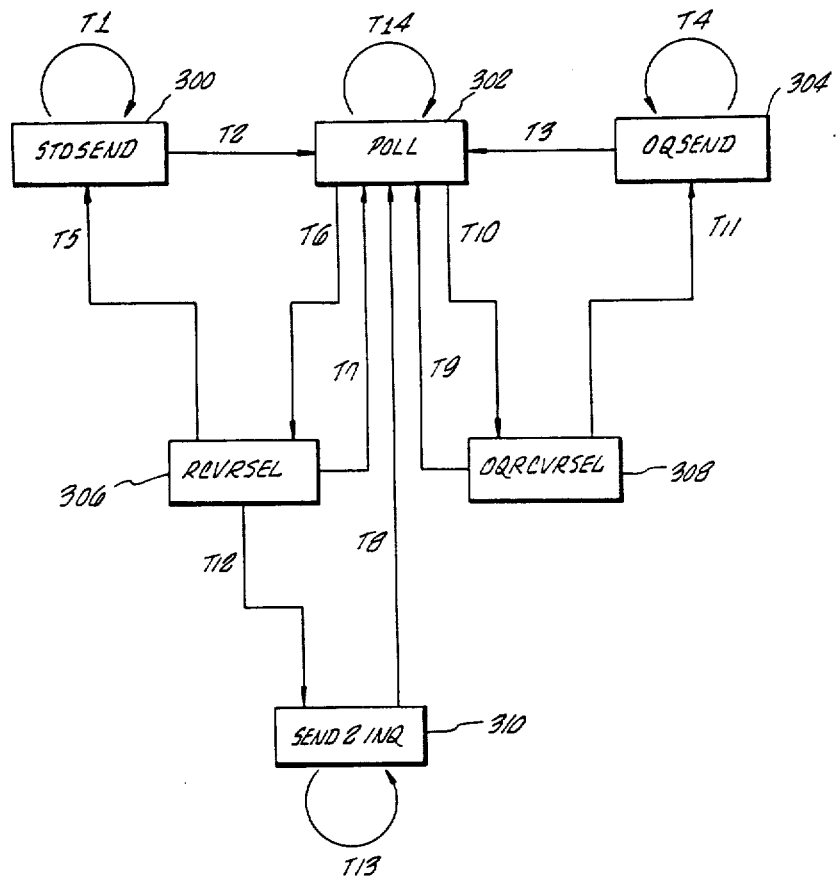

T1 = STDSEND · $\overline{CNT15}$
T2 = STDSEND · CNT15
T3 = OQSEND · $\overline{CNT15}$
T4 = OQSEND · CNT15
T5 = RCVRSEL · RCVACK · $\overline{CLUSTNOT\emptyset}$
T6 = POLL · SNDACK · $\overline{(RCVACK \cdot OUTQFULL)}$
T7 = RCVRSEL · $\overline{T5}$ · $\overline{T12}$ T8 = SEND2INQ · CNT15
T9 = OQRCVRSEL · $\overline{RCVACK}$
T10 = POLL · RCVACK · OUTQFULL
T11 = OQRCVRSEL · RCVACK
T12 = RCVRSEL · XRCVACK · CLUSTNOT$\emptyset$
T13 = SEND2INQ · $\overline{CNT15}$
T14 = POLL · $\overline{T6}$ · $\overline{T10}$

MULTIPROCESSOR MULTISYSTEM COMMUNICATIONS NETWORK

This application is a continuation-in-part of our co-pending application, Ser. No. 437,399, filed Oct. 28, 1982.

BACKGROUND OF THE INVENTION

1. Field of the Invention

The present invention relates to multiprocessor computer systems. More particularly the invention relates to multisystem networks of multiprocessor computer systems and the manner in which processors from one system communicate with processors in another system.

2. The Prior Art

Connecting two or more multiprocessor systems together in a network is desirable in many applications, such as applications where there is a need for communications between separately managed systems. Also, there is a practical limit to the number of processors which can be included in multiprocessor systems. When system size limits are reached, the only manner in which processing power may be further expanded is by connecting two or more multiprocessor systems together in a network.

When networking multiprocessor systems together, it is common to employ one of the processors in each system as a communication link and intersystem communications manager. This dedicated processor handles all of the communications between processors in the network.

Although this scheme allows for intersystem communication between processors, the use of a processor as the communication link through which all processor communications are funneled creates a bottleneck which acts to limit the information throughput rate. Since high speed and high throughput are always desirable parameters in any computer system, there is a need to provide a multisystem network which operates in a rapid and efficient manner to accomplish intersystem communications.

BRIEF DESCRIPTION OF THE INVENTION

The present invention is a multisystem network in which any processor in any system may communicate with any other processor in any one of the systems which comprise the network. Each multiprocessor system, or cluster, has associated with it a node through which it is linked via data links to other nodes associated with other multiprocessor systems.

Each node is an interface between the local interprocessor bus of the multiprocessor system with which it is associated and the data links which connect the systems together in the network. Besides containing the circuitry, firmware, and software to manage and direct the transfer of information, each node contains a series of buffer memory locations, each dedicated to a particular processor in the network and each having the capacity to store a plurality of packets of information.

Whenever a processor in any system in the network wishes to send information to any other processor in any other system in the network, it passes that information from the sender processor, across the interprocessor bus, under the control of the node to one of the buffer memory locations in its associated node which corresponds to the destination processor. Under control of the node the information is then passed through the data link to the adjacent node in the network, and under control of that node, is then placed in one of the locations in buffer memory corresponding to the destination processor.

The information is passed to successive nodes in the manner just described until it is recognized by a receiving node as being destined for a processor in the multiprocessor system associated with that receiving node. The information is passed, under control of that node, from the buffer memory location in which it has been placed to the destination processor via the local interprocessor bus.

The nodes of the present invention may be connected to one another in one of several manners, including linearly in an open chian arrangement, a star or hub and spoke arrangement, or some hybrid combination such as a redundant connected graph. Each multiprocessor system may be associated with more than one node in order to provide redundant paths to make the network more fault-tolerant.

In order to manage the flow of information through the network, the nodes communicate with their adjacent neighbors to indicate the availability of buffer space. Start and stop messages are sent to assure that the buffer space allocated to a particular destination processor in any given node is available to store any packets of information which are ready to be passed along to that node. Packets destined to a given processor may be sequentially numbered and the buffers are managed in a FIFO manner to allow for error detection and recovery.

The network of a preferred embodiment of the present invention consists of a ring of clusters, each of which is itself a multiprocessor system. Each cluster is connected to two cluster modules, each of which connects to two other adjacent neighboring cluster modules by means of two bidirectional links, forming a dual bidirectional ring. Any processor in any cluster may communicate with any other processor in any cluster although each cluster module communicates directly only with its two adjacent neighbors.

A cluster module acts as an interface node to connect each cluster to the serial data links and to the interprocessor bus (IPB) of the local system. Contained in each interface node are a series of buffer memory locations, each dedicated to a particular processor in the network and each having the capacity to store a plurality of packets of information. Since there are two directions around the cluster ring, a separate set of buffers is provided for each direction (right or left) around the ring. Packets for any processor in the network are sent around the ring in a given direction successively via one cluster module at a time. At each cluster module the packets are placed in the buffer associated with the destination processor which is to receive the message.

Because there are two rings and two possible directions around each ring, there are four possible message paths. The system attempts to send the messages over the shortest possible route. If there is a failure in the communications path chosen, the system will send the message over an alternate functioning route.

In order to efficiently manage the communications between processors, the buffer memory control circuitry utilizes upper and lower thresholds in buffer capacity, which when reached cause the cluster module controller to tell its neighbor (and its local interprocessor bus) to cease or to commence the sending of packets for that particular destination. Packets to a given processor are sequentially numbered and the buffers are managed in a FIFO manner in order to allow for error detection and recovery.

An algorithm is provided to select which interprocessor packets to send at any given time in order to avoid favoring one processor or group of processors over others.

An object of the invention is to provide multisystem multiprocessor systems intercommunications which overcome the shortcomings of the prior art.

Another object of the invention is to provide for multisystem multiprocessor intercommunications which take place at a speed greater than previously possible.

A further object of the invention is to provide for multisystem multiprocessor intercommunications without the need for the use of one dedicated processor to manage those communications.

Still a further object of the invention is to provide for multisystem multiprocessor communications in an environment utilizing several redundant pathways for enhanced reliability.

These and other objects of the present invention will become apparent to those skilled in the art from the following detailed description of the invention and accompanying drawings.

The preferred embodiment of this invention will be disclosed for use in conjunction with a multisystem multiprocessor machine environment, employing multiprocessor systems of the type disclosed in U.S. Pat. No. 4,228,496 to Katzman, et al., which is expressly incorporated herein by reference, although it will be apparent to those skilled in the art that it will be readily applicable to other configurations of multiprocessor systems.

BRIEF DESCRIPTION OF THE DRAWINGS

FIG. 1 is a multiprocessor system of the type suitable for use in the present invention.

FIG. 2 is a multiprocessor system as is shown in FIG. 1, but modified for use with the present invention.

FIG. 3 is a network configured as a ring using multiprocessor systems as shown in FIG. 2.

FIG. 8 is a flow diagram of the local OUTQ service routine.

FIGS. 9a and 9b, arranged as shown in FIG. 9, are a flow diagram of the serial INQ service routine.

FIGS. 10a and 10b, arranged as shown in FIG. 10, are a flow diagram of the serial OUTQ service routine.

FIG. 11a is the IPB controller state diagram, and FIG. 11b is the IPB transition table.

DETAILED DESCRIPTION OF THE INVENTION

Figure 4:
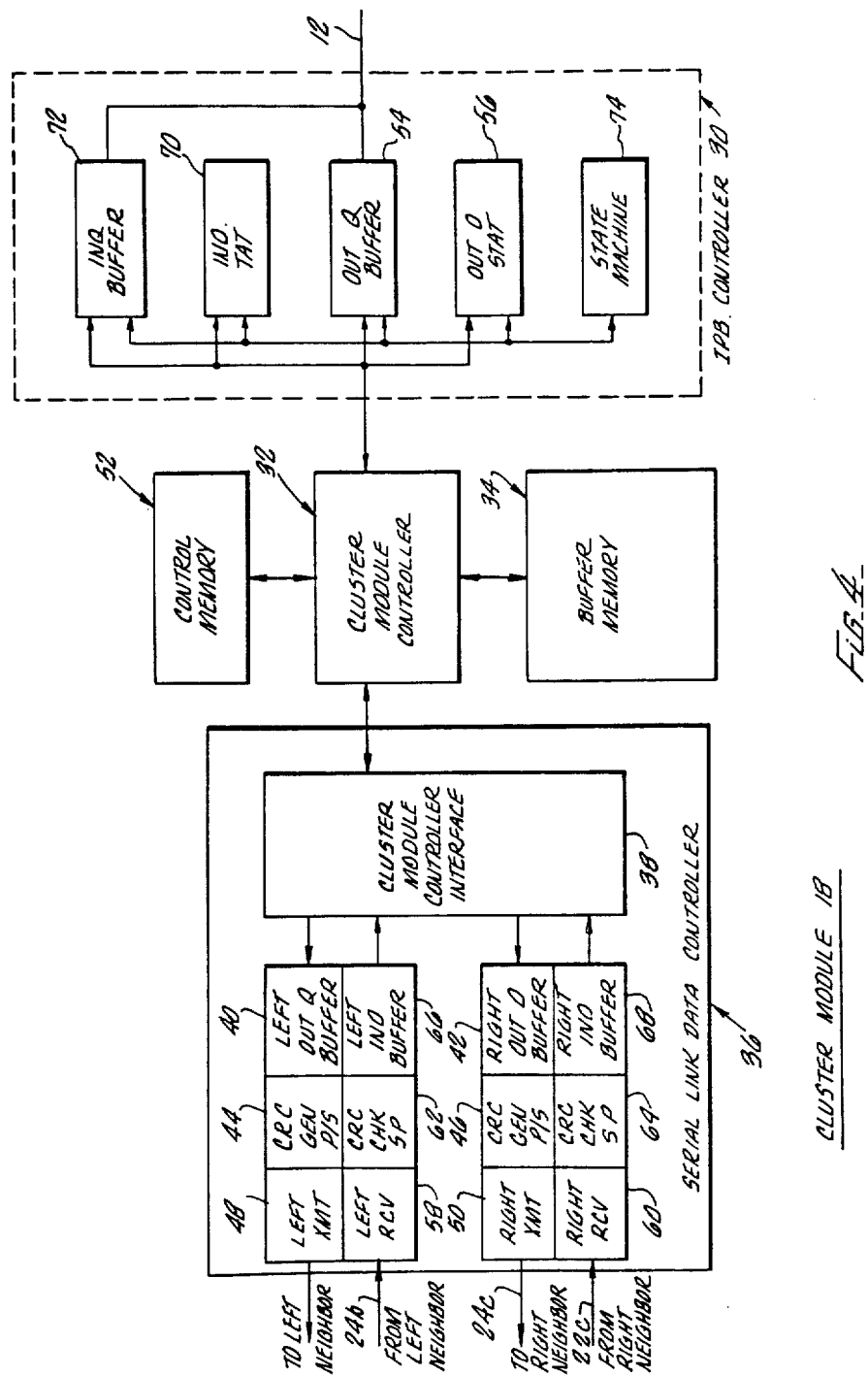
FIG. 4 is a detailed block diagram of a cluster module which may be used in the present invention.

FIG. 1 depicts the processors and interprocessor communications portion of a multiprocessor system having processors 10 each connected to an X interprocessor bus 12 and a Y interprocessor bus 14. Each of the interprocessor busses 12 and 14 is connected to an identical interprocessor bus controller 16 (IPB controller) which controls the data flow and other operations of the processors 10 in the manner disclosed in U.S. Pat. No. 4,228,496, incorporated herein by reference.

As is apparent from FIG. 1, each processor 10 (Po-Pn) can communicate with each other via either of interprocessor busses 12 or 14, which provide redundant paths to allow the system to remain in operation in the event of component failure in one part of the system. For purposes of the disclosure of the preferred embodiment, the number of processors in each individual multiprocessor system will be sixteen (n = 16), however those skilled in the art will recognize that with minor modifications of instruction word field lengths, register lengths and other obvious hardware/software changes to accommodate other numbers of processors, the system of the present invention will operate with an number of processors greater or smaller than sixteen.

It is with respect to the multiprocessor system of the type depicted in FIG. 1 that the present invention will be disclosed, although those skilled in the art will recognize that the invention is equally applicable to multiprocessor systems not providing the multiple path redundancy of the system disclosed in the U.S. Pat. No. 4,228,496. It will be appreciated, however, that such a network will not have as many possible data paths.

Referring now to FIG. 2, the basic building block of a system network built according to the present invention is depicted. As in FIG. 1, the multiprocessor system of FIG. 2 contains a plurality of processors 10 communicating on X and Y interprocessor busses 12 and 14, respectively. Unlike the system in FIG. 1, however, the multiprocessor system of FIG. 2 does not use an IPB controller 16 to act as an interface for both of its X and Y interprocessor busses 12 and 14. Instead, at each of the X and Y busses 12 and 14, each multiprocessor system used in the present invention interfaces to the network via X and Y cluster modules 18 and 20. X-cluster module 18 is connected to the X-bus and Y-cluster module 20 is connected to the Y-bus. Segments of X-left serial data link 22 and X-right serial data link 24 can be seen running from X-cluster module 18 and similar segments of Y-left and right serial data links 26 and 28 can be seen running from Y-cluster module 20. X-and Y-cluster modules 18 and 20 are identical in structure and will form the basis for a dual ring network.

As will be more clearly seen with reference to FIG. 4, X-and Y-cluster modules 18 and 20 each contain an interprocessor bus controller (IPB controller) 30 interfacing directly with the X and Y interprocessor busses 12 or 14. The functioning of IPB controller 30 in the present invention is the same as is disclosed in U.S. Pat. No. 4,228,496 for the interprocessor bus controller disclosed therein for the purposes of controlling intra-system local interprocessor bus communications except in the following three respects.

In the multiprocessor system disclosed in the U.S. Pat. No. 4,228,496, individual processors 10 are polled in sequence to ascertain if any has a message to send to other processors 10. This polling sequence is initiated by the IPB controller when a signal called SNDREQ is received by the IPB controller from the control bit portion of the interprocessor bus indicating that a processor has a packet to send to another processor.

In the present invention, the SNDREQ signal is assumed to always be asserted. The result is that system processors are constantly polled to ascertain if any has a packet or packets to send to any other processor in the same system or any other system in the network. Operation of this aspect of the IPB controller 30 and cluster module 18 will be disclosed more fully with respect to FIG. 4 and FIG. 11.

In addition, processors are preferably polled in a nonsequential manner as opposed to the sequential manner used in the system of U.S. Pat. No. 4,228,496, although a sequential polling scheme would also function in the present invention.

The third difference is the added ability of the IPB controller of the present invention to send and receive packets to and from external sources as will be more fully disclosed herein.

The multisystem network of the present invention is achieved when several systems of FIG. 2 are connected together to form a network wherein any processor in the network is capable of communicating with any other processor in the network at a high rate of speed, such as 1 megabyte/sec, as compared with the typical speed of only 7000 bytes/sec across conventional communications links. Such a configuration is depicted in FIG. 3.

Referring now to FIG. 3, a dual bi-directional ring configured network of several multiprocessor systems is shown, comprising processors 10 connected to X and Y interprocessor busses 12 and 14, terminated in interface X-and Y-cluster modules 18 and 20. Although only four of such systems are shown in FIG. 3, formed into a dual bi-directional ring network via X-cluster modules 18a, 18b, 18c and 18n and Y-cluster modules 20a, 20b, 20c and 20n, in the presently preferred embodiment, there may be up to fourteen multiprocessor systems configured in a ring structure like that of FIG. 3, since cluster number 0 is reserved for indicating local interprocessor bus transfers and cluster number 15 is reserved for monitoring and controlling cluster modules. A smaller or larger number of multiprocessor systems may be used without departing from the concepts of the present invention. Those skilled in the art will readily understand from this disclosure how larger or smaller numbers of multiprocessor systems may be configured according to the present invention.

In FIG. 3, one ring of the dual ring structure is shown having as its nodes the X-cluster modules 18 and the other is shown having as its nodes the Y-cluster modules 20. The X-cluster modules are connected together by serial data links, the X-left links 22a, 22b, 22c and 22d and the X-right links 24a, 24b, 24c and 24d. As suggested by its name, each of the links 22 and 24 transfers data only in one direction. Similarly, the Y-cluster modules 20 are connected together via links, Y-left links 26a, 26b, 26c, and 26d and Y-right links 28a, 28b, 28c and 28d. Thus, it can be seen that there are four paths which may be taken for information to travel from one cluster module to another, i.e., on any one of links 22, 24, 26 and 28.

Links 22, 24, 26 and 28 are preferably high speed fiber optic cables as are known in the art for data transmission use. Such cables interface with X and Y cluster modules 18 and 20 through the use of fiber optic interfaces (not shown) known in the art for such uses. Those skilled in the art will understand that links 22, 24, 26 and 28 may also be electronic lines rather than fiber optic cables and will understand the use of either without the need for further description herein.

Because of the multiplicity of hardware paths which can be used in inter-cluster communication, it can be seen that not only is a more reliable system possible due to the redundancy of data paths provided, but also, as will be shown, the paths can operate independently and may be used simultaneously thus providing up to four times the throughput which would be possible if only a single ring path was used.

The management and control of information which is traveling inter-system via the ring, i.e., from a processor 10 in one system to another processor 10 in another system, is handled by the logic and intelligence contained within the cluster modules 18 and 20.

Each X-cluster module 18 in a multisystem network configured according to the present invention directly communicates only with its two adjacent neighbor cluster modules. For instance, X-cluster module 18b shown in FIG. 3 communicates only with X-cluster module 18a to its immediate left and X-cluster module 18c to its immediate right. Likewise, Y-cluster module 20b communicates directly only with Y-cluster modules 20a and 20c to its immediate left and right.

Since both X-and Y-cluster modules are identical and function in an identical manner, disclosure of the operation of the network herein will be with reference only to X-cluster modules 18, it being understood that such disclosure is equally applicable to transfers of packets in either direction around the Y-cluster module ring.

Since each cluster module 18 can communicate directly only with its two adjacent neighbors, overly complex system control is unnecessary. Any cluster module 18 may communicate by sending and receiving packets in three directions: with its left-hand neighbor, with its right-hand neighbor, and with the processors 10 on the local interprocessor bus 12 to which is connected.

By way of example, and for simplication, reference to cluster module 18b of FIG. 3 shows that it may send packets to cluster module 18a via X-left serial data link 22b, to cluster module 18c via X-right serial data link 24c, and to any processor 10 on its own local X interprocessor bus 12b.

Since any processor may communicate with any other processor, any node must be able to handle traffic sent by and destined for any processor, and some means must be provided to efficiently manage this enormous potential of information transfer.

In the present invention, cluster module 18b, as illustrative of all cluster modules 18, manages all of these packet transfers via an internally-located buffer memory. The buffer memory is arranged so that each processor in the entire ring has some space assigned to it within the buffer with a capacity for a fixed number of packets. Half of this capacity is dedicated to transfers in the left direction and half is dedicated to transfers in the right direction. The space assigned to each processor is arranged as a FIFO queue so that packets destined for any given processor are delivered in the same sequence that they are sent. A single sequence check can be used by the destination processor to ascertain whether it has received all packets sent to it, thus providing for error detection and recovery.

In the presently preferred embodiment, the buffer memory space for each processor in the network in each direction around the ring will accommodate 16 packets, although, as will be readily recognized by those of ordinary skill in the art, with appropriate and obvious hardware and software changes, provision may be made for any smaller or larger capacity. This feature of the invention and the description which follows may be easily understood with reference to FIG. 4.

From an examination of FIG. 4, cluster module 18b is seen to consist of four main functional blocks, IPB controller 30, cluster module controller 32, buffer memory 34, and serial data link controller 36.

The IPB controller 30 handles all local packet transfers between processor located on X interprocessor bus 12b (local transfers), and packet transfers in and out of the ring to and from any processor on interprocessor bus 12b.

Cluster module controller 32 manages and controls all packet transfers in and out of the node comprising cluster module 18b, in conjunction with buffer memory 34. It also controls the operation of IPB controller 30 with respect to transfer of packets beyond the confines of the processors located on interprocessor bus 12b and the transfer of packets in and out of the node via serial data link controller 36, which accomplishes the actual transfer of packets between the node and serial data links 22 and 24.

The operation of cluster module 28b can be best understood with reference to its function when sending and receiving packets.

When packets are to be moved out of buffer memory 34, they have two possible destinations, either a processor on local X interprocessor bus 12b or a neighboring buffer memory 34 in cluster module 18a or 18c.

When a packet is to be sent from buffer memory 34 to a neighboring cluster module 18a or 18c, serial data link cotroller 36 is involved. Serial data link controller 36 is seen to include cluster module controller interface 38, as well as other hardware for transmitting and receiving packets.

Specificially, serial data link controller 36 includes left and right OUTQ buffers 40 and 42 respectively, left and right parallel to serial converters and CRC (cyclic redundancy check) generators 44 and 46, respectively, left and right transmitters 48 and 50 respectively, left and right receivers 58 and 60 respectively, left and right serial to parallel converters and CRC checkers 62 and 64 respectively, and left and right INQ buffers 66 and 68 respectively. The CRC generator generates a CRC-16 check word, for error detection purposes, over the transmitted data. This check word is transmitted as the last word of the data frame. A CRC checker at the receiver checks that the frame received is error free by computing a CRC word across the entire frame (including the transmitted CRC word) and verifying that the computed word is zero. CRC checking techniques are well known in the art.

Since the left and right portions of serial data link controller 36 are identical, reference will be made to the left portion only, with the understanding that the right portion functions identically.

Packets transferred on the serial data links are enveloped within a frame. In addition to the packet, each frame includes two control words and a CRC word. The control words are used for flow control, specifically start and stop messages. The CRC word is computed over the entire frame to provide for detection of erors in the transmission of the frame to the receiver. There is one other type of frame, called a "control-only" frame, which in place of a data packet may contain 16 additional control words (for a total of 18 control words and 1 CRC word). Control-only frames may be used when more than two control words need to be sent to a neighbor at any given time, when any control words need to be sent but there are no data packets to be sent or periodically when control words are circulated to update the entire network. In a preferred embodiment, a control only frame is sent each 10 milliseconds, needed or not, to insure against possible loss of a start control word.

Left OUTQ buffer may be a double buffer, having capacity to store two packets of information awaiting transmission over left serial data link 22. When one or both of its sections is empty, it asserts a buffer-not-full flag, which is read by cluster module controller 32. When both sections of left OUTQ buffer 40 are full, this flag is not asserted and the packets it contains are being transmitted, as will be disclosed more fully later.

When, however, left OUTQ buffer 40 has asserted its buffer-not-full flag, cluster module controller 32 attempts to fetch a packet from buffer memory 34 to fill it for transmission to left serial data link 22. For this purpose, cluster controller 32 uses information stored in its control memory 52 in a "ready-list". This ready-list may be a doubly linked list, as is known in the art, where each item in the list carries a reference address to the previous item and the next item on the list, and functions as follows.

When packets have arrived into cluster module 18b, cluster module controller 32 examines the packet word containing identification of the destination cluster number and destination processor number assigned to the packet. These numbers, combined with a bit indicating the direction in which the packet is moving around the ring, are used as an address in the ready-list in control memory 52. At this address is a table consisting of a series of memory locations. One location in the table is a buffer memory address pointing to the oldest packet in the FIFO queue (head of the queue). The buffer memory address pointing to the tail of the FIFO queue, where the next packet should be placed, is derived by adding the packet count (described next), modulo 16, to the head of the queue pointer. Another location in the table contains a record of the number of packets (packet count) stored in buffer memory 34 destined for the particular cluster and processor. This number is incremented by cluster module controller 32 when a packet is placed in the buffer memory 34.

The other two locations contained in the table in the ready-list in control memory 52 contain the address in control memory 52 of the previous item and next item on ready-list in control memory 52.

Another location in control memory 52 holds a pointer called "first-item", referring to the address of the first item on the ready-list. It is to this location which cluster module controller goes when it wishes to place a packet into left OUTQ buffer 40.

At that location, it fetches the address in buffer memory 34 containing the packet to be sent (head of the queue pointer), goes to that address and takes the packet and transfers it to left OUTQ buffer 40, decrements the packet count, adjusts the head of the queue pointer, and sets the first-item point to the value found in the next item location. If the decremented packet count has passed the lower threshold value, cluster module controller 32 generates a start message to send to its left hand cluster module neighbor and resets the appropriate bit in the INQ STAT table, as will be described below. If the decremented packet count has reached zero, cluster module controller 32 removes the destination cluster and processor from the ready-list, since it has nothing to send and the system avoids needless polling.

Since left OUTQ buffer 40 is a double buffer, cluster module controller 32 can be filling half of it with a packet while left CRC generator and parallel to serial converter 44 and left transmitter 48 are sending the packet contained in the other half of left OUTQ buffer 40. Left CRC generator and parallel to serial converter 44 and left transmitter 48 are clocked by an internal transmit clock (not shown) in a conventional manner.

If a control word in an incoming frame contains a stop message from the immediate left hand neighbor of cluster module 18, this stop word is recognized by cluster module controller 32, which fetches the table associated with the destination cluster and processor from control memory 52 and effectively removes it from the ready-list. This is accomplished in the manner known in the art for removing items from a doubly linked list.

Cluster module 18b is also capable of transmitting a packet to any processor on its own local interprocessor bus 12b.

When such a packet is retrieved from buffer memory 34, it is recognized and transferred to IPB controller 30 and placed in the location in OUTQ buffer 54 associated with a particular processor on the local interprocessor bus 12b. Each OUTQ buffer location has a single packet capacity for each processor on the local interprocessor bus 12b.

Associated with OUTQ buffer 54 is OUTQ STAT 56, a register having one bit position for each location in OUTQ buffer 54. When the cluster module controller wants to transmit a packet to a processor on the local bus, it first examines the contents of OUTQ STAT register bit associated with the processor. If that bit is set, it means that he corresponding OUTQ buffer is full and the cluster module controller must wait until its present packet has been transferred to the local destination processor before the next packet may be placed in that location in OUTQ buffer 54. Whenever a transfer from OUTQ buffer 54 to a local destination processor takes place, its corresponding OUTQ STAT bit is reset to signal its readiness to accept another packet for transfer to a local destination processor via local interprocessor bus 12b.

Packets arrive at cluster module 18b via left or right receivers 58 and 60 respectively, and through left or right CRC checker serial to parallel converters 62 and 64 respectively. Arriving packets are self-clocked through the receivers 58 or 60, having been formatted in Manchester type code or another self-clocking code known in the art.

Once converted to parallel form, incoming packets are placed in INQ buffers 66 and 68. INQ buffer 66 may be a double buffer, configured in that manner so that one portion of it may be filled by CRC checker serial to parallel converter 62 as the other portion is being emptied by cluster module controller 32. INQ buffer 68 is identical in structure and in function.

Cluster module controller 32 reads the destination cluster and processor number of the incoming packet. If the packet is not destined to be passed through to another cluster module 18, but is destined for a procesor 10 on the local interprocessor bus, as determined by comparing the destination cluster number of the packet with the cluster number of the cluster module, several things occur. A local IPB status list is accessed using the processor number as an address. The local IPB status list contains, for each local processor: (1) address in buffer memory pointing to the oldest packet in the FIFO queue, and (2) count of the number of packets in the queue. The packet is stored in buffer memory 34 at the location specified by an address in the table obtained from the local IPB status list, and the packet count in the table is incremented. If the new count has passed the upper threshold, a stop message is generated to be sent in the appropriate direction and the appropriate bit in the INQ STAT table is set as will be described later. If the previous packet count was zero, a flag is set indicating that the buffer for that particular processor has something to send. This flag is located in a word in control memory 52 which has a one bit flag for each processor on the local interprocessor bus 12b. This "local-ready" flag word indicating what local processors have packets to be received from the cluster module is used in conjunction with the OUTQ STAT word (previously described) to determine when to transfer a packet from buffer memory to the OUTQ for a particular local processor. Each time a packet is transferred from buffer memory to an OUTQ the packet count (for the local processor in question) in the local IPB status list is decremented. When the packet count reaches zero the flag bit for the processor in the local-ready flag word is reset, indicating that there are no longer any packets to send to that local processor. Also, when the count falls below a lower threshold, start messages are generated (similar to transfers on the serial link).

If the incoming packet is destined for another cluster module 18, the destination cluster and processor number is used as an address to access the appropriate table in the ready-list in control memory 52. The packet is placed in the address in buffer memory 34 specified in the ready-list table, and the packet count (in the table) is incremented by cluster module controller 32. If the number of packets in the buffer now exceed the upper threshold, cluster module 32 generates a stop message to send in the direction from which the packet came and sets the appropriate bit in the INQ STAT table, as will be described below. If the previous number of packets in storage in that location in buffer memory 34 was zero, that destination cluser and processor for which the incoming packet is destined is not on the ready-list, so cluster module controller 32 inserts it into the doubly linked ready-list immediately behind the location specified by the pointer indicating the first item. If, however, there has been a stop message sent from the cluster module to which the packet is to be sent next, the entry will not be made to the ready-list. When a start message is received for a particular destination processor, that processor will then be put on the ready-list, provided that the packet count is not zero.

Packets are also generated on the local interprocessor bus 12b for transmission through the ring. They are handled first by the IPB controller 30.

During the poll cycle, the first word of a packet appears on the interprocessor bus 12b, and the IPB controller recognizes it as a request for an external transfer if the destination cluster number is non zero. The destination cluster and processor number are used by the IPB controller as an address into an INQ STAT table 70 located in the IPB controller. If a stop message has been sent with respect to the buffer location which is the intended resting place for the packet, a bit will be set at the address in the INQ STAT table 70 pointed to by the first word of the packet and will, when recognized at this time, prevent the transfer from taking place. No transfer of packets to INQ buffer 72 can take place while cluster module controller 32 is addressing INQ STAT table 70.

If, however, the stop bit for that packet's destination has not been set in INQ STAT table 70 the IPB controller looks to see if the INQ buffer 72 is full by examining its flag. If the INQ buffer 72 is full, no transfer takes place; if it is empty, the packet is transferred to INQ buffer 72 in IPB controller 30 and the INQ buffer-full flag is set. This flag is periodically examined by cluster module controller 32 and if it is found to be set, the contents of INQ buffer 72 are transferred to the appropriate location in buffer memory 34 and INQ buffer flag is reset. The ready-list is then updated as described with respect to packets being received from the serial data links 22 or 24.

The operation of IPB controller 30 is under the direction of state machine 74, which is more fully described with reference to FIG. 11. State machine 74 directs the transfer of packets to and from interprocessor bus 12.

Understanding of the present invention may be facilitated by examination of the manner in which hardware and software cooperate to transfer data between processors. Transmissions of data from a processor to a processor in another multiprocessor system are initiated and accomplished under software control by means of the SEND instruction.

The following explanation assumes that a data block is to be sent from a processor 10 in the multiprocessor system (a) of FIG. 3 to a processor in the multiprocessor system (b).

In the SEND instruction, a processor 10 of FIG. 3 reads a data block from its memory, breaks it up into packets (see FIG. 5 for packet format), calculates packet checksum words, and transmits the data block one packet at a time to either of cluster modules 18a or 20a. Parameters supplied to the SEND instruction specify the use of the X (18a) or Y (20a) cluster module, the starting packet sequence number, the direction in which the packet is to be sent around the ring, the identity of the receiving cluster module, the identity of the receiving processor within the multiprocessor system connected to the receiving cluster module, the starting address of the data block in memory, the number of bytes in the data block, and the initial timeout value to wait for the outqueue 67 of FIG. 2 of U.S. Pat. No. 4,228,496 to become available.

Figure 5:
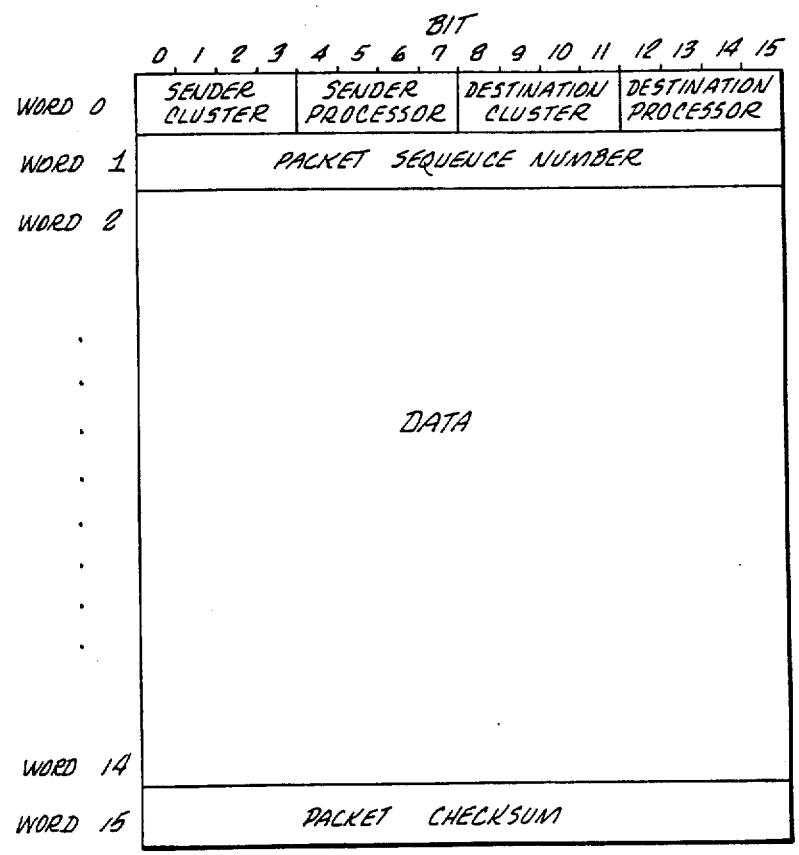
FIG. 5 is a diagram of a packet format which may be used with the present invention.

For a packet that is destined for a processor within a different cluster, the SEND instruction in the processor 10 places an indication of the direction in which to send the packet into the field identified as the sender cluster field (bits 0 to 3) of word 0 of the packet shown in FIG. 5. If the packet is to be sent to the left, a value of 0 is placed in the sender cluster field; if the packet is to be sent to the right a value of 1 is placed in the field. This value is used by the cluster module to determine the proper direction in which to send the packet. Once the direction is determined by the cluster module, the sender cluster field (bits 0 to 3) of word 0 of the packet is rewritten with the sender cluster number which is known to the cluster module.

The preferred direction in which a packet will travel to a destination processor is determined when the system is configured. Thus, the preferred direction will depend, in part, on the geometry of the network. Obviously, the main determining factor will be the path length, since it is preferrable to send packets over the shortest path. This factor is, of course, tempered by traffic volume considerations since the designer will wish to avoid potential slowdowns by balancing the traffic flow among the various paths.

For example, in a ring configuration containing 2n cluster modules, the designer will want to pick a direction which has any packet pass through fewer than n cluster modules before it reaches its destination. In a bi-directional ring, the X and Y paths should be chosen at random to balance traffic between them.

These selected directions are placed in a table in each processor in each system according to destination clusters. When a packet is ready to send to a particular cluster, the sending processor uses this table to assign a direction for the packet to take. Optionally, a compilation of error information may be used to alter the path chosen in a given direction, or the direction itself if too many errors indicate a path malfunction.

The SEND instruction terminates after the entire block has been broken into packets and transmitted; thus, the sending of a block appears to be the execution of a single instruction from the software viewpoint, although this instruction is interruptible.

The receipt of data by a processor of a multiprocessor system ((b) of FIG. 3) is not performed by means of a software instruction since the arrival times and sources of data packets cannot be predicted. The receiving of data must be enabled but cannot be initiated by the receiver.

The processor accepts a packet from the X cluster module 18b or the Y cluster module 20b by executing a bus receive microprogram (reference 115 of U.S. Pat. No. 4,228,496) which takes the received data packet from the inqueue section of the inter-processor control 55 of U.S. Pat. No. 4,228,496, verifies the correct checksum and sequence number, and stores the data in a memory buffer.

The reassembly of received packets into blocks is accomplished using bus receive table entries in memory. A bus receive table entry corresponds to a specific multiprocessor system ((a) of FIG. 3) and processor ((12a) of FIG. 3) within that system. The bus receive table entry contains a memory address, a count word, and an expected sequence number.

As each data packet is received, the bus microprogram is activated. This microprogram accesses the bus receive table entry that corresponds to the sending multiprocessor system and processor within that system. If the received packet contains a correct checksum and if its sequence number matches the expected sequence number of the next packet to be received, then the data words of the packet are stored into the specified area and adjustments are made to the area address, sequence number, and byte count in the bus receive table to prepare for receipt of the next packet in sequence. If the count has reached zero or any error is detected, a software interrupt is caused.

This method of processing the received packets permits recovery from errors in the transmission process by retransmission of the entire block of data. All packets that are duplicates of those packets that may have been correctly received during a previous transmission will be recognized as being out of sequence and will not be deposited in memory.

Reliable message transmission is accomplished by a protocol implemented between processors of the multiprocessor system. Each transmission that is received without indication of error is positively acknowledged by a subsequent transmission from the receiving processor to the sending processor. The receipt of this acknowledgment at the sending processor confirms to the sending processor that the transmission was indeed received.

When a sending processor first sends a transmission, it determines a time by which the acknowledgment should have been received based upon a specified time interval. If no acknowledgment has been received by the predetermined time, then a retransmission will take place and a new time will be determined based upon the same specified time interval. Thus, retransmissions will take place repeatedly until an acknowledgment is received by the sending processor.

Since the transmissions may be sent through either of two cluster modules (18a and 20a), and in either of two directions (left or right), there are four possible transmission paths that may be used in sending a block of data to a receiving processor. When a sending processor initiates the attempt to transmit a data block to a receiver, it selects one of the four paths according to certain state information that is available to it. This state information includes the definition of the preferred direction (left or right) that is built into the software when it is created, and the number of errors that have previously occurred on each path. If the number of errors exceeds a certain threshold, the path is considered down and is no longer used. In selecting a path, an attempt is made to choose the X or Y bus at random in order to achieve a more even distribution of traffic.

When the sending processor has not received an acknowledgment from the receiving processor after a certain time interval has elapsed, it selects the path for the retransmission attempt according to a rule built into the system intelligence. The rule is somewhat arbitrary and can be any algorithm which efficiently takes into account both the same state information referred to in the preceding paragraph and also the identity of the path used on the previous transmission attempt. This rule is used to ensure that the successive retransmission attempts will switch through all four paths in some sequence, or through all available paths when one or more paths is down because of errors.

In a presently preferred embodiment, a data block is sent on one of two busses in a given direction. If no acknowledgment is received in the allotted time, retransmission is attempted. After a second instance of no acknowledgment, the data block is sent on the other bus in the same direction. After two instances of no acknowledgment, the busses in the other direction are tried in a similar manner. This process is repeated, if necessary, unless it is clear that no path is functioning.

In the event that transmission of a block of data is successful but the acknowledgment message from the receiver is not successfully transmitted back to the transmitter, the retransmission attempts that are initiated by the transmitter will cause sequence errors to occur at the receiver since the packets have already been successfully received and the bus receive table sequence number has been updated. The receiver detecting the sequence errors will send an additional acknowledgment packet on all four paths, or on all available paths when one or more paths is down because of errors.

Thus, messages can be successfully transmitted and acknowledged if any one of the four paths from the sender to the receiver and any one of the four paths from the receiver to the sender are functional.

The operation of cluster modules is now described in detail, in conjunction with a presently preferred control structure, by reference to FIGS. 6–11. Each cluster module controller 32 directs operation of each cluster module 18 by repeatedly examining input queues, output queues, and an interval timer (not illustrated). Each input queue is serviced when it becomes full by transferring data from the associated input queue to the buffer memory 34. Similarly, each output queue is serviced when it becomes empty, by transferring data from buffer memory 34 to the associated output queue. Timer services are performed periodically when the interval timer triggers an interrupt.

Buffer memory 34 is divided into fixed length spaces of sixteen packets each. Each possible destination processor in the ring is allocated two of these spaces in buffer memory 34, one space for each of the two directions in which a packet may travel to any destination processor 10. These spaces in buffer memory 34 are treated as FIFO queues such that packets are sent in the order in which they are received. Each queue (space) in buffer memory 34 is managed by the cluster module independent of the state of any other queue. For example, a cluster module handles packets going to a processor in the left direction completely independent of any packets going to that same processor in the right direction.

The cluster module controller 32 manages the allocation and use of the FIFO queues in buffer memory 34. In order to manage the queues, the cluster module controller 32 maintains a table of information in its control memory 52 for each queue in the buffer memory 34 (queue-control table). Each queue-control table contains a count of the number of packets currently in the associated queue (packet count), a pointer to the oldest packet in the queue (head pointer), and a pointer to the newest packet in the queue (tail pointer). The location of the queue in buffer memory 34 allocated for a particular destination processor and direction is determined by the cluster and processor numbers of that destination and the direction. Likewise, the location of the associated queue-control tables in the control memory 52 is determined by cluster and processor numbers of that destination and the direction. Those skilled in the art will recognize that the absolute address is purely a matter of choice.

When a packet is received at a cluster module, the cluster module controller 32 locates the proper queue in the buffer memory 34 and th proper queue-control table in control memory 52 based on the destination cluster and processor numbers and the direction in which the packet is to be sent. Before placing the packet into the queue, the cluster module controller 32 increments the packet count. If the new packet count exceeds sixteen, the packet is discarded and the queue-control table in control memory 52 is not altered. If the new packet count is less than or equal to sixteen, the tail pointer is incremented, modulo 16, the packet is placed into the queue at the location pointed to by the new value of the tail pointer, and the tail pointer and packet count in the queue-control table are updated with the new values.

When a packet is to be sent, the cluster module controller 32 locates the proper queue in the buffer memory 34 and the proper queue-control table in control memory 52 based on the destination cluster and processor numbers and the direction in which the packet is to be sent. The cluster module controller 32 then removes the packet from the location in the queue pointed to by the head pointer, increments the head pointer, modulo 16, decrements the packet count, and updates the queue-control table in control memory 52 with the new values.

Thus, the contents of each queue-control table always contains the correct values for the head pointer (which points to the next packet in that queue to send), the tail pointer (which points to the last packet placed into that queue), and the packet count (which indicates how many packets are currently contained in that queue).

The cluster module controller 32 must have an efficient method for selecting the next packet in the buffer memory 34 to send. This may be accomplished by maintaining a ready-list as previously described in the form of a doubly linked list of the queue-control tables which have a non-zero packet count. The preferred method is to maintain two additional types of tables of information in the control memory 52; cluster ready-to-send tables and processor ready-to-send tables. There are two cluster ready-to-send tables, one for each direction. The location of the cluster ready-to-send tables in control memory 52 are determined by the direction in which the packets are to be sent although those skilled in the art will recognize that the absolute address assigned is purely a matter of choice. There are two processor ready-to-send tables for each possible cluster, one for each direction. The location of the processor ready-to-send tables in control memory 52 are likewise determined by the cluster number and the direction in which the packets are to be sent.

Each ready-to-send table is made up of three parts: a packets waiting mask, a flow-control mask, and a priority mask. There is a one-to-one relationship between bits in each mask and a particular cluster (or processor 10) number. Each bit in the packets-waiting mask indicates if there are packets in buffer memory 34 waiting to be sent to the cluster (or processor 10) number associated with that bit. Each bit in the flow-control mask indicates the flow control state (stopped or started as explained below) of the cluster (or processor 10) associated with that bit. The logical product (AND) of a packets-waiting mask and a flow-control mask is a ready-to-send mask where each bit in the ready-to-send mask indicates if there are packets in buffer memory 34 that can currently be sent to the cluster (or processor 10) associated with that bit. The priority mask is used to indicate at which bit the ready-to-send mask search is to be started. In the priority mask, the bits associated with the last cluster (or processor 10) for which a packet was sent and all lower numbered clusters (or processors) are reset and the bits associated with all other clusters (or processors) are set. Thus, the logical product (AND) of the ready-to-send mask and the priority mask forms a mask in which only the bits associated with those clusters (or processors) numbered higher than the last cluster (or processor 10) sent to can be set.

When a packet is placed in buffer memory 34, the bit associated with the packet's destination processor is set in the packets-waiting mask of the processor ready-to-send table associated with the packet's destination cluster and direction. Similarly, the bit associated with the packet's destination cluster is set in the packets-waiting mask of the cluster ready-to-send table associated with the direction in which the packet is to be sent.

When a packet is removed from buffer memory 34, if the packet count for the queue goes to zero, then the bit associated with the packet's destination processor is reset in the packets-waiting mask of the processor ready-to-send table associated with the packet's destination cluster and direction. If this operation results in a packets-waiting mask with no bits set (there are no more packets waiting to be sent to that cluster), then the bit associated with the packet's destination cluster is reset in the packets-waiting mask of the cluster read-to-send table associated with the direction in which the packet is sent. Also, the priority masks in the processor and cluster ready-to-send tables are set to indicate to which destination processor and cluster the packet is being sent.

The use of the ready-to-send tables can best be explained using an example. To initiate a packet transfer, the cluster module controller 32 gets the cluster ready-to-send table for the appropriate direction from the control memory. It then searches the logical product of the ready-to-send and priority masks sequentially for the first bit which is set indicating a cluster for which there are packets which can be sent. If no cluster is found by searching the logical product of the ready-to-send and priority masks, then the ready-to-send mask is searched in a similar manner to find a cluster to which to send. Once a cluster is selected, the processor ready-to-send table associated with that cluster is obtained from control memory 52 and searched in a similar manner. When the destination and processor have been selected, the associated FIFO queue and queue-control table are located, the packet pointed to by the tail pointer is removed from the queue, and the queue-control and ready-to-send tables are updated as previously described.

This two-step search operation implements an effective round-robin priority scheme where the last cluster (and the last processor within a cluster) sent to is always given the lowest priority for sending next. Thus, all possible destination clusters (and processors within a cluster) are given a fair share of the available serial data link bandwidth.

The preferred method of selecting the next packet in buffer memory 34 to send to was chosen to take advantage of the efficient search capabilities of the hardware priority encoder that is part of the cluster module controller 32. Those skilled in the art will recognize that the previously described ready-list would also work.

Because packets for any given destination may arrive at a cluster module at a higher rate than they are leaving that cluster module, a flow control protocol is required. Flow control is achieved using stop messages, start messages, and the INQ STAT table 70. Associated with the FIFO queues in buffer memory 34 are two constant values referred to as the stop threshold and the start threshold. When a packet is placed in a queue, the new packet count is compared against the stop threshold. If the new pack count is equal to or greater than the stop threshold, then the queue is considered full and action is taken to stop the flow of packets into that queue (referred to as stopping the destination). The flow of packets into the queue from the local interprocessor bus is stopped by setting the bit in the INQ STAT table 70 associated with the destination. The flow of packets into the queue from the serial data link is stopped by sending the appropriate neighbor cluster module a stop message. Stop messages are normally sent in the control words of the serial link frames and contain th cluster and processor number of the destination which is to be stopped.

When a packet is removed from a FIFO queue in buffer memory 34, the new packet count value is compared to the start threshold. If the new packet count is equal to the start threshold and the destination has been previously stopped, then action is taken to start the flow of packets into the queue (referred to as starting the destination). The flow of packets into the queue from the local interprocessor bus is started by resetting the bit in the INQ STAT table 70 associated with the destination. The flow of packets into the queue from the serial data link is started by sending the appropriate neighbor cluster module a start message. Start messages are normally sent in the control words of the serial link frames and contain the cluster and processor number of the destination which is to be started.

Start and stop messages are not sent immediately but are queued for sending in a special, two word, queue associated with each serial data link and are included in the next frame sent on that serial data link. If there are more than two control messages to be sent on a serial data link or there are no packets waiting to be sent on that serial data link, then a control-only frame is sent. A control-only frame is a frame in which the packet data is replaced with a bit map which represents the start/- stop status of all destination processors in the direction of interest. Control-only frames are also sent at periodic intervals to maintain flow control synchronization. Thus, if a start message is lost due to a transient serial data link error, that destination will be started by the next periodic control-only frame.

Because control messages take some time to be sent to and acted on by the neighboring cluster module, the stop threshold must be chosen to be less than the actual size of the FIFO queues. Also, to maximize the queue utilization, the start threshold is chosen to be greater than zero. In the presently preferred embodiment, for example, with a FIFO queue having a sixteen packet capacity, six and eight were chosen as the start and stop thresholds respectively.

When a cluster module controller 32 receives a stop control message, it resets the associated bit in the flow-control mask of the associated processor ready-to-send table. If the resultant flow control mask is all zero (indicating that all processors in that destination are stopped), then the associated bit in the flow-control mask of the associated cluster ready-to-send table is reset. When a cluster module controller 32 receives a start control message, it sets the associated bit in the flow control mask of the associated processor ready-to-send table and the associated bit in the flow control mask of the associated cluster ready-to-send table. When a cluster module controller 32 receives a control-only frame, it updates the flow control masks in all the processor and cluster ready-to-send tables associated with the direction from which the frame came.

In a preferred embodiment, there is a mechanism to deal with "runaway" packets. A "runaway" packet is one which has gone all the way around the netork and remains unclaimed.

The runaway packet mechanism operates as follows. When a packet is taken from the local interprocessor bus 12, its destination cluster number (see FIG. 5) is replaced with a bit field which is initialized to zero. Each time the packet is received at a cluster in the ring, this bit field value is read and incremented. If the value read is equal to or exceeds the number of clusters in the network, i.e., the packet has visited all clusters and remains unclaimed, it is discarded.

Referring now to FIGS. 6-11, a presently preferred cluster module operational sequence is depicted. Upon system startup, an initialization routine (not shown) is performed which initializes, registers and tables, clears flags, and initializes all processor control or cluster control structures, in the typical manner for initialization well understood in the art. It sets the INQ STAT table 70 in the IPB controller 30 to accept packets for all valid destination addresses.

Figure 6:
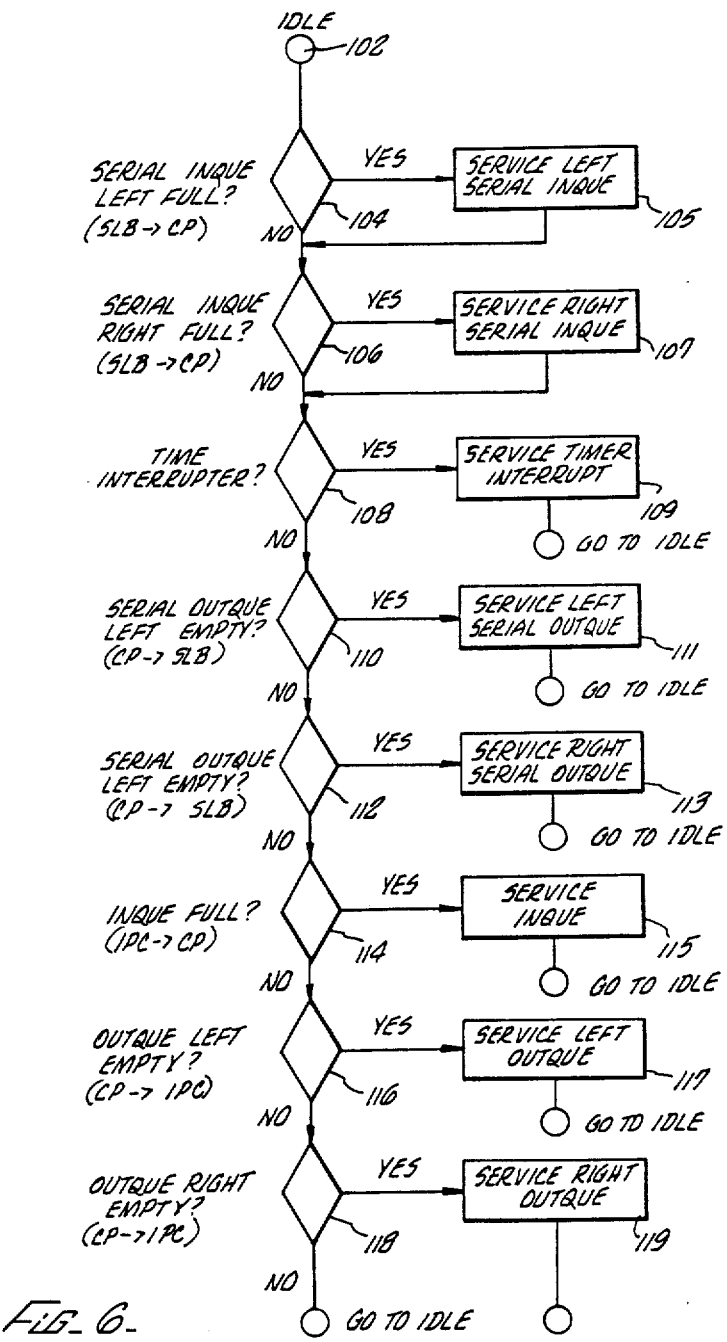
FIG. 6 is a flow diagram of the idle loop routine for a preferred embodiment of the present invention.

Referring first to FIG. 6, an idle-loop 102 is entered, which repeatedly polls each trigger item or resource in the loop in turn. The service associated with the resource is performed if necessary.

The left serial INQ check 104 tests the flag in left serial INQ buffer 66 to see if it is full indicating that the left serial INQ needs servicing. If so, the left serial INQ service routine 105 is performed and the loop is continued.

The right serial INQ check 106 next tests the flag in right serial INQ buffer 68 to see if it is full indicating that the right serial INQ needs servicing. If so, the right serial INQ service routine 107 is performed and the loop is continued.

The timer-runout check 108 next tests to see if an internal interval timer has counted down to zero. If so, the timer-runout service routine 109 is performed which includes sending "control-only" frames at those intervals, and the idle-loop 102 is then reentered. If not, the loop is continued.

The left serial OUTQ check 110 next tests to see if the left serial OUTQ buffer 40 is empty by examining its flag. If so, the left serial OUTQ service routine 111 is performed, and the idle-loop 102 is reentered. If not, the loop is continued.

The right serial OUTQ check 112 next tests to see if the right serial OUTQ buffer 42 is empty by examining its flag. If so, the right serial OUTQ service routine 113 is performed, and the idle-loop 102 is reentered. If not, the loop is continued.

The local INQ check 114 next tests to see if the local INQ buffer 72 is full by examining its flag. If so, the local INQ service routine 115 is performed, and the idle-loop 102 is reentered. If not, the loop is continued.

The left local OUTQ check 116 next tests to see if there are left-direction packets for a particular processor whose local OUTQ buffer 54 is empty. If so, the left local OUTQ service routine 117 is performed, and the idle-loop 102 is reentered. If not, the loop is continued.

The right local OUTQ check 118 tests if there are right-direction packets for a particular processor whose local OUTQ buffer 54 is empty. If so, the right local OUTQ service routine 119 is performed, and the idle-loop 102 is reentered. If not, the loop is continued.

The idle-loop 102 is reentered each time it terminates. Although only one idle-loop 102 is describd, in a presently preferred embodiment several idle-loops are executed to prevent overly concentrating on service requests which are tested for earlier in the loop. Once a resource has been serviced, rather than reentering the original idle-loop 102, the steps which service both serial outqueues 111 and 113, the inqueue 115, and local outqueues 117 and 119 are permutted. Similar loops are entered which perform the same services but in a different order, except for the three tests 104, 106 and 108, which are always tested first. This has the effect of dynamically revising the priority of each service so as to assure equal attention to each resource.

Figure 7:
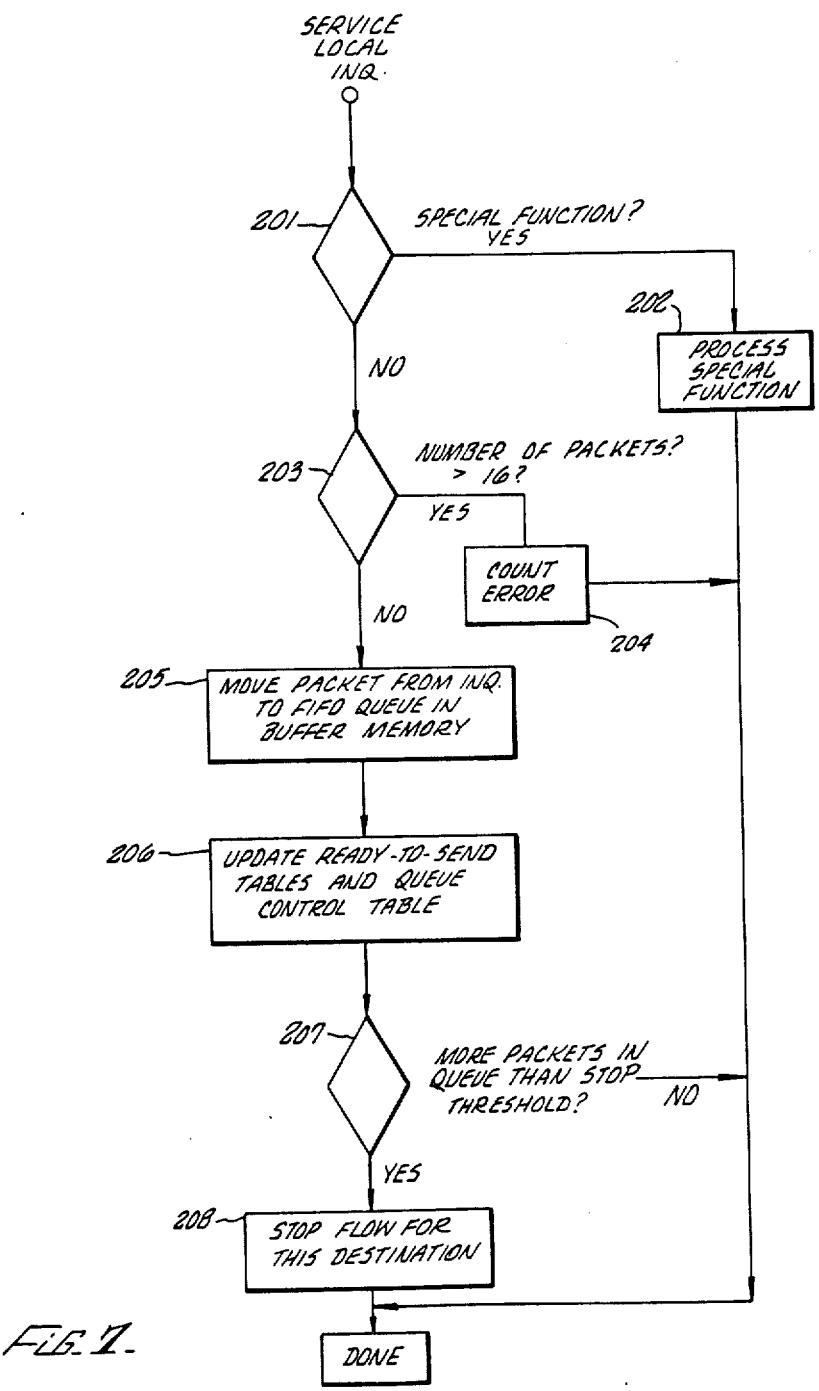
FIG. 7 is a flow diagram of the local INQ service routine.

Referring now to FIG. 7, a flow chart for the local INQ service routine 115 is depicted.

The special-function check 201 examines the incoming packet to test for a packet which requests a special function. If so, the service routine terminates and the special-function routine 202 is executed. If not, the service routine continues.

The storage-overrun check 203 next examines the queue control table allocated to the destination processor for the incoming packet to test for a storage overrun, i.e., a packet count greater than 16. If so, the storage-overrun error-count is incremented at step 204, and the service routine is terminated since there is no available space in FIFO queue in buffer memory 34. If not, the service routine continues. This error count may optionally be used to perform diagnostics.

The packet frame is next moved from the INQ buffer 72 into the FIFO queue in buffer memory 34, at step 205, and the packet is added to the ready-to-send tables at step 206.

The flow-control check 207 examines the packet-count in queue control table to determine if it is equal to or greater than the stop threshold. If so, at step 208 the previously-described actions to stop the destination are taken.

The INQ service routine is then terminated.

Referring now to FIG. 8, the local OUTQ service routine 117 (left) or 119 (right) is depicted.

The rotating priority encoder is used to select an OUTQ which is empty and which has pending packets, at step 211. The proper packet is then moved from the FIFO queue in buffer memory 34 to the selected OUTQ at step 212.

At this point, a parity check 213 may be used to test for a parity error. If an error exists, an optional parity error-count (useful for diagnostics) in control memory 52 may be incremented at step 214; otherwise, a bit in the OUTQ STAT register 56 corresponding to the destination processor is set at step 215. The queue control table for the destination processor is then updated at step 216.

The empty-queue check 217 examines the queue control table to test for an empty FIFO queue. If so, at step 218 the destination processor ready-to-send table is updated as previously described and the local INQ service routine terminates. If not, the service routine continues.

The flow-control check 219 tests to see if the packet count is equal to the start threshold. If so, at step 220 the previously described actions to start the destination are taken, and the local OUTQ service routine is terminated.

Referring now to FIGS. 9a and 9b, the serial INQ service routine is shown.

The control-only check 221 examines the packet to test for a control-only frame. If so, the flow control masks are updated at step 223 and the serial INQ service routine is terminated. If not, the service routine continues.

The storage-overrun check 226 next examines the queue control table allocated to the destination processor for the incoming packet to test for a storage overrun, i.e., a packet count greater than 16. If so, an optional storage-overrun error-count useful for diagnostics may be incremented at step 227; incoming control words are processed, and the serial INQ service routine terminates. If not, the service routine continues.

The runaway-packet check 228 examines the packet to test if the packet is visiting its 16th node. If so, the packet is discarded and an optional runaway-packet error-count useful for diagnostics may be incremented at step 229, incoming control words are processed, and the serial INQ service routine terminates. If the packet is not a runaway packet, the service routine continues.

The packet frame is moved from the serial INQ buffer 66 or 68 into the FIFO in buffer memory 34 at step 230.

The queue control table is updated at step 235.

The flow-control check 236 tests if there are more packets queued in the buffer area than the stop threshold. If so, the previously described action to stop the destination is taken.

The packet is linked into the ready-to-send tables are updated as previously described at step 238.

Incoming control words are processed at step 239 and the serial INQ service routine is terminated.

Figure 10B:
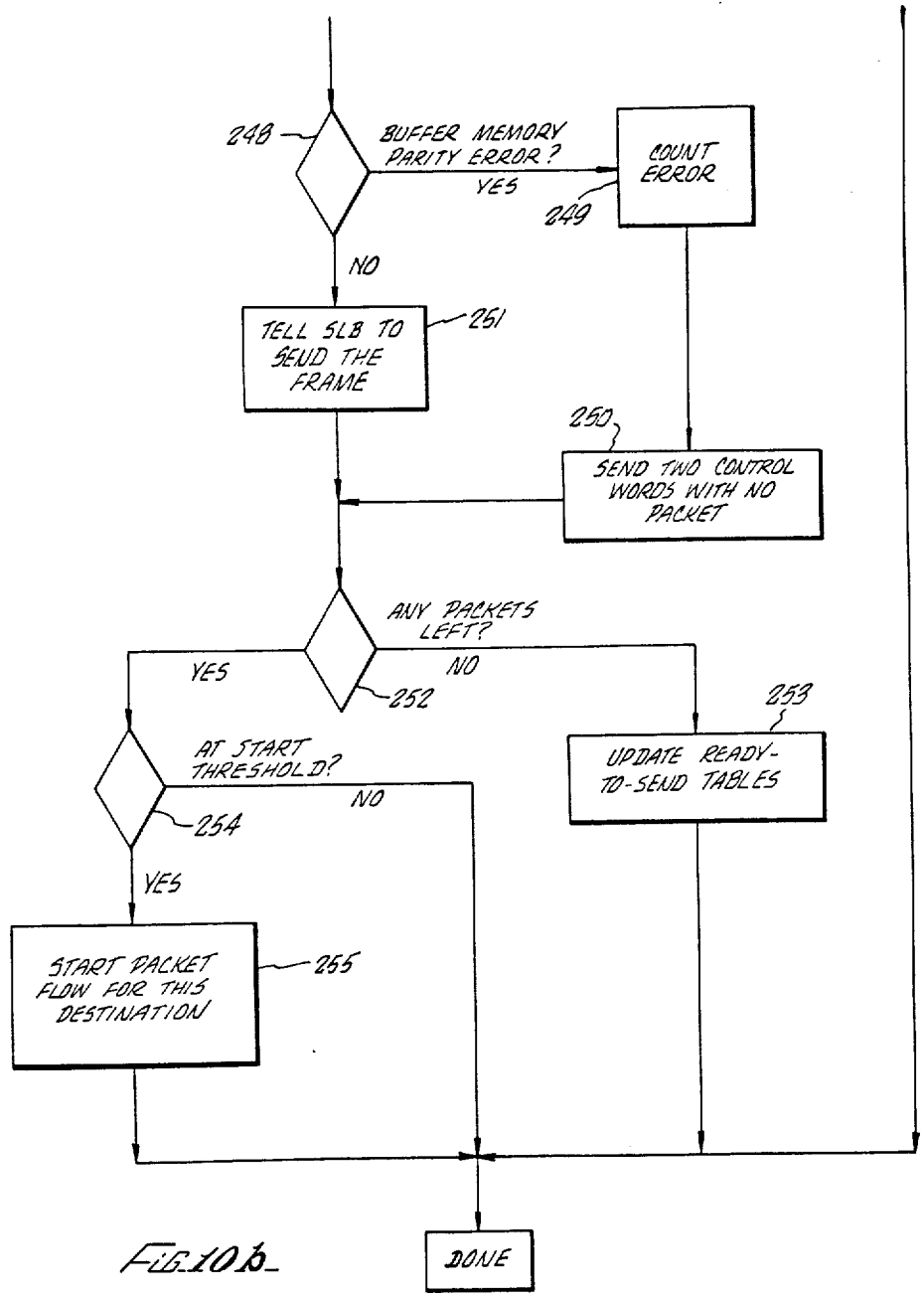

Referring now to FIGS. 10a and 10b, the serial OUTQ service routine for either of the left or right OUTQ is depicted.

The resync check 241 tests if there are more than two control words to be sent, or if the resync interval timer has run out. In a preferred embodiment, this interval is 10 milliseconds. If either condition is met, a "control-only" frame is sent at step 242, and the serial OUTQ service routine is over. If not, the routine continues.

The round-robin priority scheme is used to select a cluster and processor at step 243. If there is either no cluster to select or no processor within that cluster to select, the control-word check 245 is invoked. The control-word check 245 tests if there are control words in the control word queue to be sent. If so, two control words are sent with no packet at step 246. The service routine is then over. If, however, a cluster and processor is chosen, the service routine continues.

The selected packet is then moved from the FIFO queue in buffer memory 34 to the serial OUTQ buffer 40 or 42. Control words are added from the control word queue. The queue-control tables are then updated at step 247.

The memory-parity check 248 tests for a buffer memory parity error. If an error is detected, an optional memory-parity error-count useful for diagnostics may be incremented at step 249, and two control words are sent with no packet at step 250. Otherwise, the frame is sent as is at step 251.

The packets-remaining check 252 tests for remaining packets in the FIFO queue. If there are none, the ready-to-send tables are updated at step 253 and the serial OUTQ service routine is over. Otherwise, the routine continues.

The flow-control check 254 tests to see if the packet count is equal to the start threshold. If so, at step 255 the previously described action for starting a destination is taken.

The serial OUTQ service routine is then over.

The IPB controller 30 controls information transfers between pairs of local processors and between local processors and the cluster module. It is attached to the IPB bus and is directly connected to the cluster module. Control lines are used to transmit control signals between the IPB controller and local processors and between the IPB controller and the cluster module controller.

Data from one local processor to another is moved by a method much like that of U.S. Pat. No. 4,228,496. When a processor is selected to transmit a packet, it places the packet's destination address on the IPB. The local destination processor is then ordered to receive a packet from the IPB. The local source processor then moves the packet, via the IPB, to the local destination processor.

Data from a local processor to the cluster module is moved from the local source processor to the IPB controller's INQ buffer 72. The INQFULL flag is set, signalling the cluster module that a packet is ready. The cluster module then moves the packet to buffer memory 34 and resets the INQFULL flag.

Data from the cluster module to a local processor is first moved by the cluster module from buffer memory 34 into the local processor's associated OUTQ buffer 54. The associated flat in the OUTQ STAT register 56 is set, signalling the IPB controller that a packet is ready. The destination local processor is ordered to receive a packet from the IPB. The IPB controller then moves the packet, via the IPB, to the destination local processor.

Flow control between local processors and the cluster module is used to prevent overflow of the FIFO queues in buffer memory 34. The INQ STAT register 70 is used to signal the IPB controller which FIFO queues are switched on or off. Each bit in the INQ STAT register 70 indicates a destination processor and direction in the network; when the bit is set, the IPB controller refuses any packets addressed to that processor and network direction.

Referring now to FIG. 11a, the IPB controller state diagram is depicted.

The control logic for the IPB controller is implemented as a state machine with six states. These are called STDSEND 300, POLL 302, OQSEND 304, RCVRSEL 306, OQRCVRSEL 308 and SEND-2INQ310. Fourteen transitions (T-1 through T-14 illustrated in FIG. 11b) are defined which indicate when a state change should occur.

In the POLL state, no information transfers are taking place. The IPB controller polls each local processor in turn for a request to send a packet (signal SNDACK) and its ability to receive a packet (signal RCVACK). It also tests the local processor's associated bit in the OUTQ STAT register 56 (signal OUTQFULL).

If RCVACK and OUTQFULL are both asserted (i.e., there is a packet from the cluster module which the local processor can receive), transition T-10 to OQRCVRSEL state is triggered. A transfer from the cluster module is initiated. If either RCVACK or OUTQFULL is negated (i.e., there is no packet or the local processor cannot receive it), the IPB controller tests for signal SNDACK.

If SNDACK is asserted (i.e., the local processor has a packet to send), the local processor will assert the packet destination address onto the IPB. The IPB controller receives this address and triggers T-6 to the RCVRSEL state. A transfer from the local processor is initiated. Otherwise, transition T-14 is triggered and the IPB controller continues on to poll the next local processor.

In the OQRCVRSEL state, a transfer from the cluster module is about to occur. The IPB controller selects the polled local processor and asserts RCVCMD. If the local processor responds with RCVACK, transition T-11 to the OQSEND state is triggered. Otherwise, transition T-9 to the POLL state is triggered.

In the OQSEND state, a cluster module to local processor transfer is in progress. Sixteen words of data from the OUTQ buffer are asserted onto the bus and received by the local processor. The IPB clock 88, located in the IPB controller 30, generates a clock signal which repeatedly triggers transition T-4 to perform this function. When the transfer is complete, transition T-3 to the POLL state is triggered.

In the RCVRSEL state, a transfer from the local processor is about to occur. The IPB controller examines the cluster number in the previously-asserted destination address.

If it is zero, indicating a local transfer, the IPB controller will select the destination local processor and assert RCVCMD. On a RCVACK response, transition T-5 to STDSEND is triggered; otherwise transition T-7 to the POLL state is triggered.

If the cluster number is non zero, indicating a network transfer, the IPB controller will check its ability to receive the packet for the cluster module (signal INQFULL) and the flow control status for the destination processor (signal INQSTAT, the associated flag in the INQ STAT table). If both INQFULL and INQSTAT are negated (i.e., the input buffer is not full and no stop message has been sent), transition T-12 to the SEND2INQ state is triggered. If either INQFULL or INQSTAT is asserted transition to the POLL state T-7 is triggered.

In the STDSEND state, a local processor to local processor transfer is in progress. Sixteen words of data from the sender local processor are asserted onto the bus and received by the destination local processor. The IPB clock 88, located in the IPB controller 30, generates a clock signal which repeatedly triggers transition T-1 to perform this function. When the transfer is complete, transition T-2 to the POLL state is triggered.

In the SEND2INQ state, a local processor to cluster module transfer is in progress. Sixteen words of data from the sender local processor are asserted onto the bus and received by the INQ buffer. The IPB clock 88, located in the IPB controller 30, repeatedly triggers transition T-13 to perform this function. When the transfer is complete, transition T-8 to the poll state is triggered.

FIG. 11b is a table showing the conditions which trigger each of the state transitions T-1 through T-14. In each case, the first term in the logic equation is the present state. The term CNT15 refers to the number of words in a packet (see FIG. 5) which are kept track of during transmission and receipt of packets in order to keep the system in synchronization.

Although the invention has been disclosed with respect to a preferred embodiment, those skilled in the art will recognize from the within disclosure that other embodiments of the present invention may be configured without departing from the spirit of the disclosure, which embodiments remain within the scope of the invention. Therefore, the scope of the present invention is to be limited only by the appended claims.

We claim:

1. A network of multiprocessor systems, including:
   a plurality of multiprocessor systems, each of said systems containing at least one processor connected to an interprocessor bus,
   a plurality of node interfaces, each connected to a respective one of said interprocessor busses, each of said node interfaces having at least one data link connecting it to at least one other node interface such that all of said node interfaces are characterized by the property of global connectivity,
   a buffer memory in each of said node interfaces, having a plurality of storage locations for temporarily storing message packets to be transferred to any one of said processors in said network, said storage locations being partitioned into groups of storage locations, each one of said groups corresponding to a particular one of said processors in the network which is the destination processor for all of said message packets placed at locations therein, control means in each of said node interfaces for controlling the transfer of said message packets into the buffer memory in its respective node interface from the data link connecting the respective interface node to its adjacent neighbor interface nodes and from the interprocessor bus connected to the respective interface node, and for controlling the transfer of said message packets out of the buffer memory in the respective node interface to the data link connecting the respective interface node to its adjacent neighbor interface nodes and to the interprocessor bus connected to the respective interface node, means, in each of said control means, for determining how many of the storage locations in a group of storage locations (in the buffer memory in its node interface) corresponding to a particular destination processor are full.

2. The network of multiprocessor systems of claim 1 further including means in each of said control means for halting the transfer of said message packets for any destination processor when a number greater than a first predetermined member of said group of storage locations corresponding to that destination processor are full and resuming the transfer of said message packages to that destination processor when a number less than a second predetermined number of said group of storage locations corresponding to that destination processor are full.

3. The network of multiprocessor systems of claim 2 wherein said plurality of node interfaces are connected to one another by at least one data link in the form of a ring.

* * * * *